United States Patent
Michaelis

(10) Patent No.: US 6,286,456 B1
(45) Date of Patent: Sep. 11, 2001

(54) PET BED OR SIMILAR ARTICLE AND METHOD OF MAKING THE SAME

(76) Inventor: Dana C. Michaelis, P.O. Box 245, Roanoke, TX (US) 76262

(*) Notice: Subject to any disclaimer, the term of this patent is extended or adjusted under 35 U.S.C. 154(b) by 0 days.

(21) Appl. No.: 09/360,668

(22) Filed: Jul. 26, 1999

Related U.S. Application Data

(60) Provisional application No. 60/094,147, filed on Jul. 25, 1998.

(51) Int. Cl.[7] .................................................. A01K 1/035
(52) U.S. Cl. ................................................................ 119/28.5
(58) Field of Search ............................. 119/28.5, 727, 119/728; D30/118; 5/627, 655; 297/462

(56) References Cited

U.S. PATENT DOCUMENTS

| | | | |
|---|---|---|---|
| D. 294,752 | 3/1988 | Palier | D30/118 |
| D. 314,252 | 1/1991 | Horne | D30/118 |
| D. 328,162 | 7/1992 | Barreto et al. | D30/118 |
| D. 338,284 | 8/1993 | Barreto et al. | D30/118 |
| D. 338,744 | 8/1993 | Marlon et al. | D30/118 |
| D. 340,322 | 10/1993 | Merritt | D30/118 |
| D. 346,246 | 4/1994 | Barreto et al. | D30/118 |
| D. 368,335 | 3/1996 | St John | D30/118 |
| D. 376,875 | 12/1996 | Glickstein | D30/118 |
| D. 377,852 | 2/1997 | Iben | D30/118 |
| D. 379,682 | 6/1997 | Rafaat | D30/118 |
| D. 391,688 | 3/1998 | McMahon | D30/118 |
| D. 392,775 | 3/1998 | McMahon | D30/118 |
| D. 394,920 | 6/1998 | Krizek | D30/118 |
| D. 395,143 | 6/1998 | McMahon | D30/118 |
| 2,577,741 | * 12/1951 | Creveling et al. | 297/462 |
| 3,902,456 | 9/1975 | David | 119/28.5 |
| 4,212,090 | * 7/1980 | Ehrlich | 297/462 |
| 5,000,116 | * 3/1991 | Fife et al. | 119/28.5 |
| 5,765,502 | * 6/1998 | Haugh | 119/28.5 |
| 5,860,389 | 1/1999 | Caldwell | 119/28.5 |

* cited by examiner

Primary Examiner—Charles T. Jordan
Assistant Examiner—Elizaeth Shaw

(57) ABSTRACT

A pet bed or similar article which is designed to be comfortable for the pet, consisting of a cushion, a frame which elevates the cushion and provides a suspension system providing the pet with a furniture feel, an easily cleaned skirted slipcover which covers the cushion and frame with a method for securing the slipcover to the perimeter of the trampoline frame, and method of making the same. The method of making the pet bed comprising the steps of: making the cushion by cutting the three panels, joining the peripheral portions of the top and bottom panels to the side panel, stuffing the cushion casing, and closing up the access opening left for the stuffing steps, making the slipcover by cutting the pieces of the slipcover, joining the pieces of the slipcover and attaching the skirt and method for attaching skirt to frame, placing cushion on flexible support surface of the frame, and covering the cushion and frame with the slipcover and securing to frame.

2 Claims, 3 Drawing Sheets

PET BED OR SIMILAR ARTICLE AND METHOD OF MAKING THE SAME

BACKGROUND—CROSS-REFERENCES TO RELATED APPLICATIONS

This application claims the benefit of Provisional Patent Applications Ser. No. 60/094,147, filed Jul. 25, 1998.

BACKGROUND—FIELD OF INVENTION

This invention includes the apparatus and methods for providing a slipcovered, elevated pet bed or similar article.

BACKGROUND—DESCRIPTION OF PRIOR ART

This invention relates to a pet bed or similar article designed to be used by domestic pets such as dogs and cats. Specifically, to a pet bed having a cushion and slipcover installed over an extremely durable mini-trampoline frame assembly providing cushion support, a suspension system for comfort, elevation preferred by pets, and the novel method of making the same. The slipcover converts the apparatus to an aesthetically pleasing article of furniture, suitable for any household environment. Additionally, the slipcover can be easily removed and cleaned.

There are numerous pet beds in the prior art which are used to provide a comfortable resting place for an animal to lie on. Heretofore, pet beds have been made of various shapes, different designs and of varying materials. One such bed set forth in U.S. Pat. No. 5,860,389 to Caldwell (1999) includes a rectangular wood frame and a hammock type surface; however, it does not have a thick cushion, a slipcover, or flexible suspension system for comfort. Additionally, with a wooden frame, cleaning might be a problem over time. Additionally, U.S. Pat. No. 3,902,456 to David (1975) is a donut-shaped pet cushion with no elevating frame or slipcover. Finally, numerous other Design Patents take the form of canvas stretched over metal frames (D37962, Hormoz, 1997 and D338744, Marlon and Marlon, 1993), hammocks (D294752, Palier, 1988), chairs (D314252, Horne, 1991 and D392775, McMahon, 1998), cushions on platforms (D376875, Glickstien, 1996 and D391688, McMahon, 1998 and D395143, McMahon, 1998), or unusual shapes such as teepees (D394320, Krizek, 1998 and D328162, Barreto and Paxman, 1992), boats (D346246, Barreto and Paxman, 1993 and D338284, Barreto and Paxman, 1993), animal shapes (D368335, St. John, 1996 and D340322, Merritt, 1993), and pyramids (D377852, Iben, 1997 and D394920, Krizek, 1998).

While each of these patented pet beds undoubtedly will serve the purpose for which they were designed, none is regarded as accomplishing the purpose in an optimum manner, in terms of comfort and attractiveness. Accordingly, there is still a need for a pet bed, which has the appearance of a piece of slipcovered fuirniture and includes a suspension system providing additional comfort to the pet. The general objective of the present invention is to provide a novel pet bed that is a substantial improvement in these areas. The pet bed in the preferred embodiment of the present invention is specifically designed to be attractive, easy to clean, and have an extremely durable frame. Depending on the stuffing material selected for the cushion and the firmness of the filling, a concave recess in the bed may be created over time so that the sleeping animal is able to satisfy its inborn instinct to withdraw into a recess while sleeping.

SUMMARY OF THE INVENTION

The present invention may be fabricated quickly and easily by using a mini-trampoline frame, a cushion made of fabric and stuffmng material sufficiently the same shape as the frame, and a skirted fabric slipcover. As illustrated in the preferred embodiment of the invention shown a mini-trampoline frame assembly provides the cushion support and suspension system for comfort, the elevation preferred by pets, and the novel method of making the same. The slipcover makes it look like an ottoman and converts the pet bed to an aesthetically pleasing article of fuirniture, suitable for any household envirornment. Additionally, the slipcover can be easily removed and cleaned. Depending on the stuffing material selected for the cushion and the firmness of the filling, a concave recess in the bed may be created over time so that the sleeping animal is able to satisfy its inborn instinct to withdraw into a recess while sleeping. Other aspects and advantages invention will become apparent from the following detailed description, taken in conjunction with the accompanying drawings.

REFERENCE NUMERALS IN DRAWINGS

Figure 1:
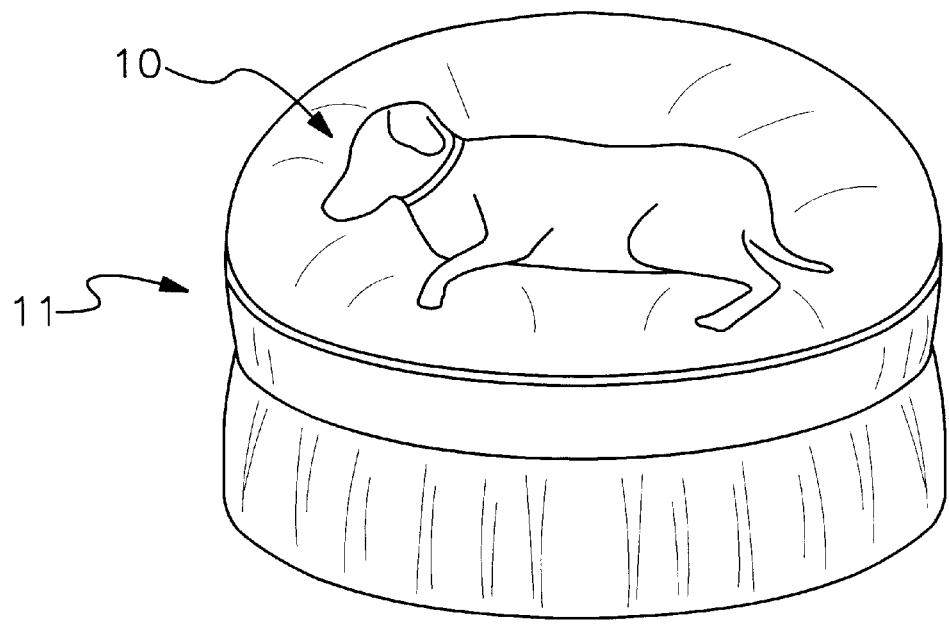
FIG. 1 is a perspective view of the completed and assembled pet bid with a sleeping dog shown on the bed.
Figure 2:
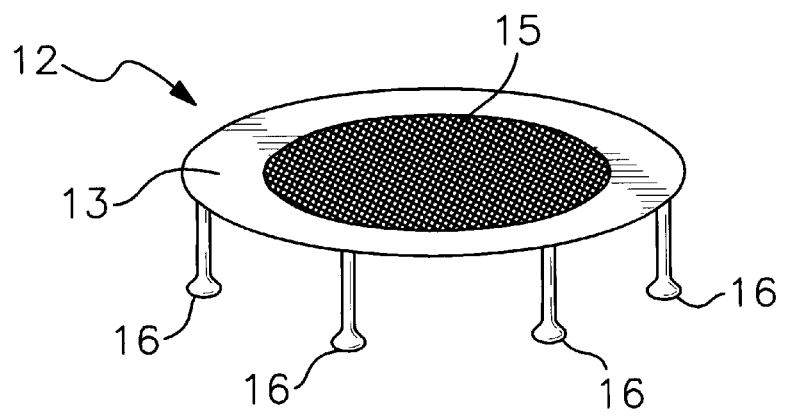
FIG. 2 is a perspective view of a mini-trampoline frame to be used as a support frame and suspension system for the cushion and slipcover.
Figure 3:
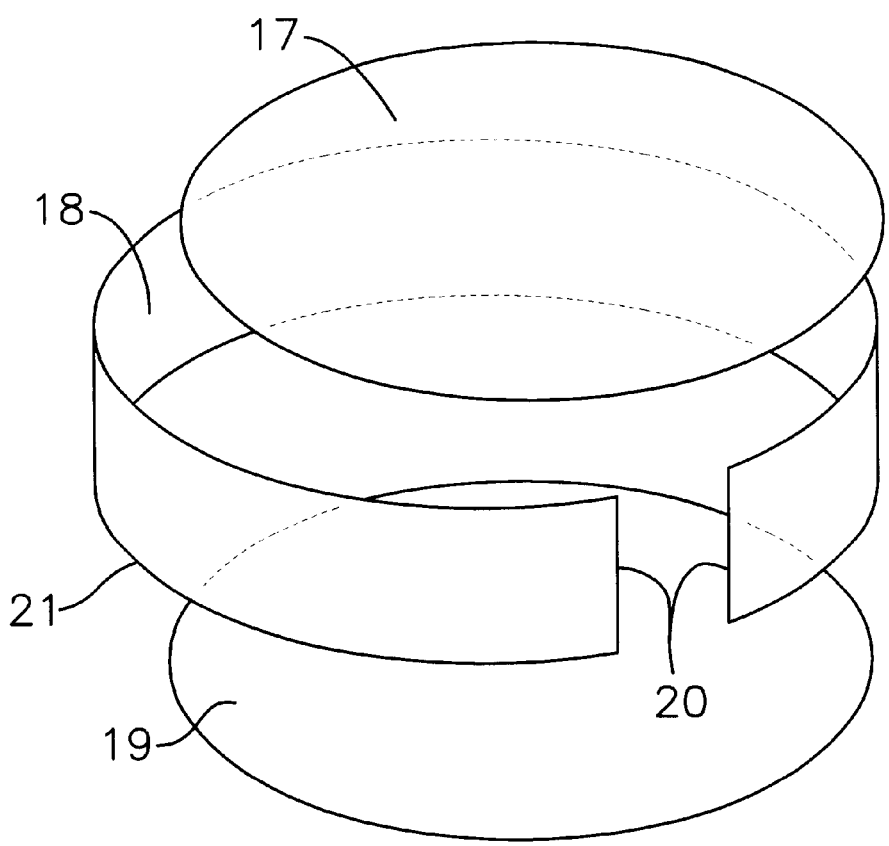
FIG. 3 is an exploded perspective view schematically illustrating the basic components of the cushion, except the stuffing, prior to assembly of the parts.
Figure 4:
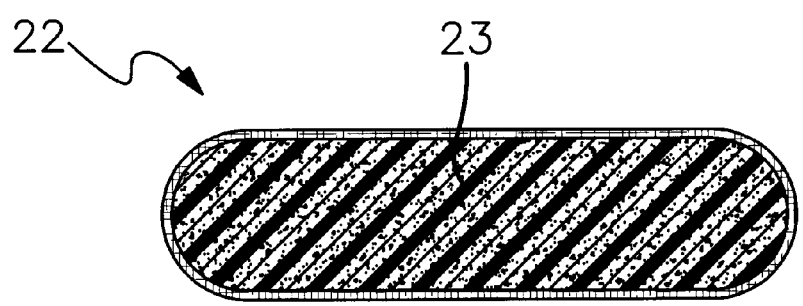
FIG. 4 is an enlarged cross-sectional view of the cushion showing the stuffing material.
Figure 5:
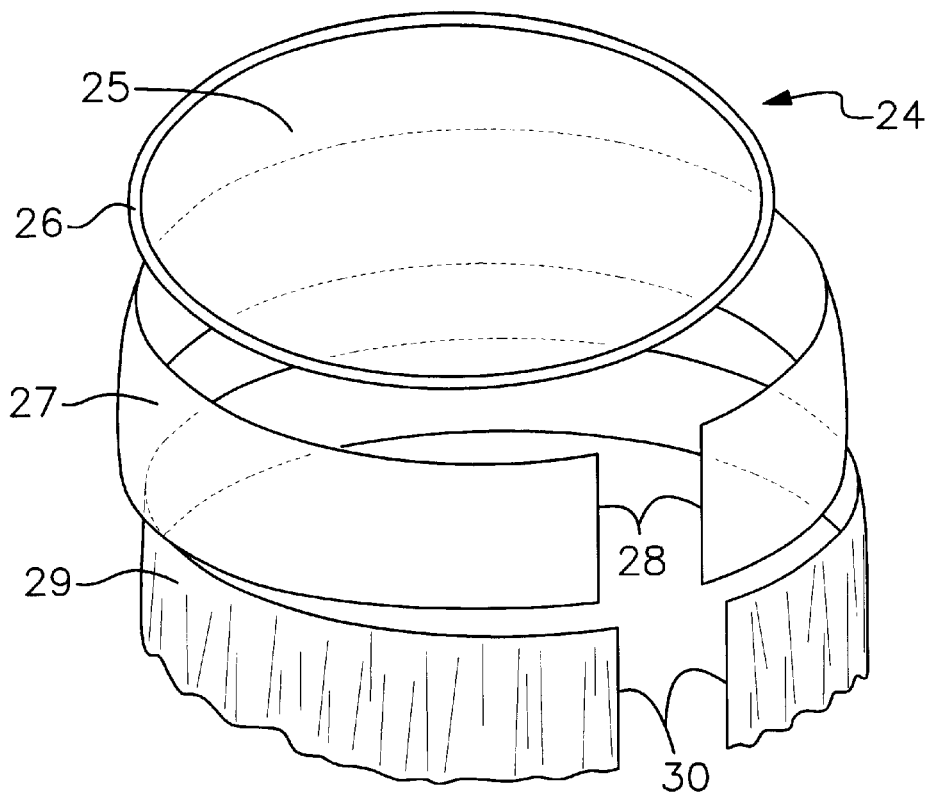
FIG. 5 is an exploded perspective view schematically illustrating the basic components of the slipcover, prior to assembly of the parts.
Figure 6:
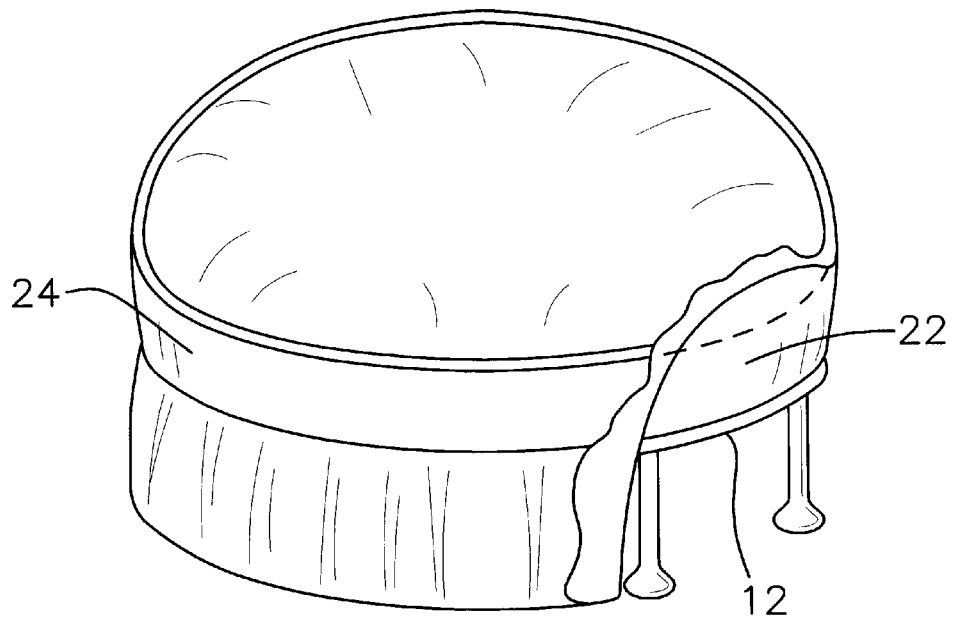
FIG. 6 is a perspective view of completed slipcover and cushion assembled on the frame with one side of the slipcover's skirt lifted to show the cushion and frame underneath.

FIG. 1
10 Sleeping dog
11 Fully assembled pet bed
FIG. 2
12 Frame—a mini-trampoline frame assembly
13 Frame perimeter covered by vinyl spring cover
15 Flexible support surface and suspension system
16 Legs
FIG. 3
17 Cushion top panel
18 Cushion side panel
19 Cushion bottom panel
20 Side panel ends
21 Cushion casing
FIG. 4
22 Cross-sectional view of cushion
23 Fill or stuffing material in central recess
FIG. 5
24 Slipcover
25 Slipcover top panel
26 Piping around perimeter of top panel
27 Slipcover side panel
28 Side panel ends 29 Slipcover skirt panel
30 Slipcover skirt panel ends
FIG. 6
12 Frame
22 Cushion
24 Slipcover installed over cushion and frame
28 Skirt lifted up to show cushion and frame

DETAILED DESCRIPTION OF THE PREFERRED EMBODIMENT—FIGS. 1 to 6

As shown in FIGS. 1 and 2, the first component of this invention for use as a bed 11 for a domestic pet 10 is embodied in a mini-trampoline frame assembly 12 with a plurality of legs 16, sebsequently referred to as a frame and indicated generally by the reference number 12. As shown in FIGS. 3 and 4, cushion 22 is comprised essentially of a three panel casing with a central recess 23 and an annular mass of stuffing material 23 filling the casing 21. As shown in FIG. 5, a slipcover 24 consists of a disc-shaped top panel 25, optional piping 26, a side panel 27 with ends 28 joined forming a continuous loop, and a skirt 29 with ends joined 30 forming a continuous loop. Referring to FIG. 6, the slipcover 24 covers both cushion 22, placed on the flexible support surface 15 (see FIG. 2) and frame 12 and includes a method (not shown) for securing the slipcover 24 to the frame 12 preventing inadvertent removal and may consist of ties, a hook and loop fastening system, or other methods. Referring to FIGS. 2 and 6, slits may need to be cut in the vinyl spring cover 13 in order to secure the slipcover 24 to frame 12.

The details of the structure of the cushion casing 22 are shown most clearly in FIG. 3. The casing consists of a disc-shaped top panel 17, a similar bottom panel 19, and a side panel 18 with a length approximately the same as the circumference of the top 17 and bottom panels 19 and the mini-trampoline frame 12 (shown in FIG. 2).

Referring to FIG. 3, in making the cushion casing 21, panels 17 and 19 are cut the desired shape and size as determined by the frame being used. Side panel 18 is cut with a length equal to, or slightly greater than, the circumference of the panels 17, 19, and the frame 12 (see FIG. 2), preferably from the same material. For example, for a frame 90 centimeters (36 inches) in diameter, the panels 17, 19 may be made with a diameter of 93.75 centimeters (37½ inches) which includes a seam allowance, and the side panel 18 will be cut with a length approximately equal to the computed circumference and a width of approximately 10 to 12 centimeters (4 to 5 inches). The side panel ends 28 are sewn together forming a continuous loop prior to attaching to panels 17 and 19. When the panels 17 and 19 have been prepared, the side panel 18 is sewn to the upper edge perimeter of the top panel 17. Next, the bottom edge of the side panel 18 is sewn to the perimeter of the bottom panel 19. An access opening (not shown) should be left somewhere in this seam, for use in the eventual stuffing of the cushion. At this stage, the cushion casing 21 is ready for stuffing with a suitable material such as polyester fiberfill, shredded foam, or the like 23. The access opening is then sewn shut. Optional stitch(es) (not shown) sewn through the cushion 22 and connecting the upper and lower panels act(s) as a baffle in the chamber to regulate the flow of the stuffing 23.

The details of the structure of a slipcover 24 are shown most clearly in FIG. 5, and consists of a disc-shaped top panel 25, optional piping 26, a side panel 27 with ends joined 28 forming a continuous loop, and a skirt 29 with ends joined 30 forming a continuous loop. Referring to FIG. 6, the slipcover 24 covers both cushion 22 and frame 12 and includes a method (not shown) for securing the slipcover 24 to the frame 12 preventing inadvertent removal and may consist of ties, a hook and loop fastening system, or other methods.

In making the slipcover 24, the top panel 25 is cut the desired shape and size as determined by the frame being used. The side panel 27 is cut with a length equal to or slightly greater than the circumference of the top panel 25 and the frame 12 (see FIG. 2), preferably from the same material. A suitable width for this side panel 27 would be approximately 10 to 12 centimeters (4 to 5 inches). The ends 20 of the side panel 28 are sewn together forming a continuous loop prior to attaching to the top panel 25. Optional piping 26 of approximately 1.25 centimeters (½ inch) in diameter is sewn to the perimeter of the top panel 25 overlapping ends neatly before the side panel 27 is sewn to the upper edge perimeter of the top panel 25. The skirt panel 29 width is approximately the measurement from the frame's perimeter to the floor plus a seam and hem allowance. The skirt panel 29 length, depending on the fullness of the gathers desired, is approximately 2 to 3 times the circumference of the frame 12 (see FIG. 2) and top panel 26. Next, the gathered skirt 29 with the skirt panel ends sewn together 30 are attached to the bottom edge of the side panel 27. Finally a method for securing the slipcover 24 to the frame 12 (not shown) is attached in the seam between the side panel 28 and skirt 29 and may consist of ties, a hook and loop fastening system, or other methods.

Conclusion, Ramifications, and Scope

Accordingly, it is apparent that this invention represents a novel use of an existing article, a mini-trampoline frame. In addition, the pet bed is an attractive, easily cleaned, and comfortable pet bed with a durable frame and suspension system. Finally, depending on the stuffing material and the firmness of the stuffing, in time, a concave recess may be made by the pet so that the sleeping animal is able to satisfy its inborn instinct to withdraw into a recess while sleeping.

Although the description above contains many specificities, these should not be construed as limiting the scope of the invention but as merely providing illustrations of the presently preferred embodiment of this invention. Various modifications and changes may be made without departing from the spirit and scope of the invention. For example, a bottom zippered panel the same size as the top circular panel could be used completely encasing the cushion, but is generally considered unnecessary. The slipcover skirt may be pleated instead of gathered. The slipcover may omit the apparatus to attach the slipcover to the frame. If the bed is intended for a small dog, large dogs may disturb the slipcover if it is not attached onto the frame. The cushion may be fitted with a method of attaching the cushion to the frame, for stabilizing the cushion to the frame. A two-panel cushion casing could also be used without the side panel as long as the stuffed cushion ends up being approximately or slightly larger than the circumference of the frame. Additionally, a solid foam rubber support cushion could be used. When using foam rubber for the cushion a slightly rounded top and sides may be desired.

The mini-trampoline is considered the optimum frame for the pet bed. Obviously, it could be made square, oval, or any other shape without departing from the invention so long as the cushion has a matching shape with the outside dimensions of the cushion approximately equal to the outside dimensions of the frame. Additionally, alternate methods of providing the suspension system could be employed. For example: canvas with grommets and stretchy cord or elastic could be laced around an alternate type of frame. Furthermore, the suspension system could be omitted altogether and a flat panel of rigid material with legs or a box could also be slipcovered.

Thus, the scope of the invention should be determined by the appended claims and their legal equivalents, rather than by the examples given.

I claim:

1. A pet bed or similar article comprising:
   a. a supporting base comprising a spring suspension and flexible fabric frame assembly including a plurality of legs and providing a flexible support surface, disposed within the frame and suspended in an elevated position by said frame and said legs;
   b. a cushion placed on said frame with a circumference approximately the same size as the outer perimeter circumference of said frame comprising:
      (1) an outer cushion casing formed from a soft, pliable fabric comprising a disc-shaped top panel similar in size and shape to a bottom panel, an elongated side panel of same material with a length substantially equal to the circumference of said top and bottom panels and said frame, the short ends of the said side panel being joined, forming a loop, and the longitudinal sides of said side panel being joined to the peripheral edges of said top and bottom panels with upper and lower edges of said side panel being substantially parallel;
      (2) a relatively thick disc-shaped mass of resiliently compressible stuffing material of fiberfill, polystyrene beads, foam rubber, wood chips, or like matter and disposed in said outer casing in the chamber between said bottom and top panels;
      (3) optional switches sewn in the center of the casing connecting the upper and lower sides act as a baffle in the chamber to regulate the flow of said stuffing; and
   c. a removable skirted slipcover for protecting said cushion and said frame that is easily washable or otherwise cleanable where the outer perimeter of said frame and said cushion makes a tight fitting engagement with said slipcover when placed over said cushion and said frame with said slipcovers' skirt extending over said frame with hem of said skirt near the floor comprising:
      (1) a top panel of fabric, optional piping, an elongated side panel of same material, the short ends of said side panel being joined, forming a loop, with a length substantially equal to the circumference of said top panel and said frame, and the longitudinal sides of said side panel being joined to the peripheral edges of said top panel and top gathered edge of said skirt, the short ends of said skirt panel being joined, also forming a loop, with upper and lower edges of said side panel being substantially parallel.

2. The method of making the pet bed or similar article comprising the steps of:
   a. making said cushion by cutting the three panels, joining the peripheral portions of said top and bottom panels to said side panel, stuffing said cushion casing, and closing the access opening left for the stuffing steps,
   b. making said slipcover by cutting the pieces of said slipcover, joining said pieces of said slipcover and attaching said skirt and means for attaching said slipcover skirt to said frame,
   c. placing said cushion on spring suspended flexible support surface of said frame, and
   d. covering said cushion and said frame with said slipcover and securing to said frame.

* * * * *